United States Patent
Morlang et al.

(10) Patent No.: US 11,416,269 B2
(45) Date of Patent: Aug. 16, 2022

(54) METHOD, SYSTEM AND COMPUTER PROGRAM PRODUCT FOR SERVING USER SETTINGS INTERFACE COMPONENTS

(71) Applicant: MOTOROLA SOLUTIONS, INC., Chicago, IL (US)

(72) Inventors: Richard Morlang, North Vancouver (CA); Cody Yarbrough, North Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 26 days.

(21) Appl. No.: 16/953,384

(22) Filed: Nov. 20, 2020

(65) Prior Publication Data

US 2022/0164199 A1 May 26, 2022

(51) Int. Cl.
*H04L 67/12* (2022.01)
*H04N 7/18* (2006.01)
*H04N 5/232* (2006.01)
*H04N 5/77* (2006.01)
(Continued)

(52) U.S. Cl.
CPC ............ *G06F 9/451* (2018.02); *G06F 8/65* (2013.01); *H04N 5/23216* (2013.01); *H04N 5/77* (2013.01); *H04N 7/18* (2013.01); *H04L 67/12* (2013.01)

(58) Field of Classification Search
CPC .. G06F 9/451; G06F 8/65; H04N 7/18; H04N 67/12; H04N 5/23216; H04N 5/77
See application file for complete search history.

(56) References Cited

U.S. PATENT DOCUMENTS

| | | | |
|---|---|---|---|
| 5,604,860 A * | 2/1997 | McLaughlin | G03G 15/502 715/810 |
| 7,802,246 B1 * | 9/2010 | Kennedy | G06F 8/61 717/173 |
| 8,167,430 B2 | 5/2012 | Cobb et al. | |

(Continued)

FOREIGN PATENT DOCUMENTS

| CA | 2651061 | 7/2014 |
|---|---|---|
| CN | 104796301 A | 7/2015 |
| WO | 2017020511 A1 | 2/2017 |

OTHER PUBLICATIONS

Get the best combination of Analysis + Control with NetFlow Analyzer v12.4, Flow-based Network Traffic Monitoring for in-depth traffic analysis, https://www.manageengine.com/products/netflow/, downloaded from internet: Aug. 3, 2020, all pages.

*Primary Examiner* — Shourjo Dasgupta (57) ABSTRACT

A method, system and computer program product for serving user settings interface components is disclosed. The method includes processing a device configuration library to obtain executable codes for serving a plurality of pre-generated and device-specific user interface components. The method also includes carrying out a selection of a reduced subset of compatible user interface components and available settings, from the plurality of user interface components, as a function of a model identifier for a sensor device and a firmware version installed at the sensor device. The method also includes generating a customized package containing the reduced subset of the compatible user interface components and relevant settings that is served for provisioning at the sensor device.

17 Claims, 4 Drawing Sheets

(51) Int. Cl.
*G06F 8/65* (2018.01)
*G06F 9/451* (2018.01)

(56) References Cited

U.S. PATENT DOCUMENTS

| | | | | |
|---|---|---|---|---|
| 8,612,965 | B2* | 12/2013 | Sakai | G06F 8/65 |
| | | | | 717/172 |
| 8,718,440 | B2* | 5/2014 | Khan | H04N 21/4147 |
| | | | | 386/200 |
| 8,744,124 | B2 | 6/2014 | Venkatesh et al. | |
| 8,922,658 | B2* | 12/2014 | Galvin | H04N 7/181 |
| | | | | 348/E7.054 |
| 9,098,749 | B2 | 8/2015 | Bala et al. | |
| 9,244,675 | B2* | 1/2016 | Tsuji | G06F 1/3284 |
| 9,348,492 | B1 | 5/2016 | Penilla et al. | |
| 9,571,800 | B2* | 2/2017 | Carey | G06F 21/55 |
| 9,860,490 | B2* | 1/2018 | Galvin | H04N 21/274 |
| 10,026,007 | B1* | 7/2018 | Morton | G06V 20/52 |
| 10,079,828 | B2* | 9/2018 | Usie | H04N 5/23206 |
| 10,157,526 | B2* | 12/2018 | Galvin | H04L 65/608 |
| 10,477,158 | B2* | 11/2019 | Galvin | H04N 5/77 |
| 10,498,752 | B2 | 12/2019 | Di Pietro et al. | |
| 10,636,173 | B1* | 4/2020 | Beach | G06V 10/751 |
| 10,972,780 | B2* | 4/2021 | Ganster | H04N 21/2743 |
| 11,012,683 | B1* | 5/2021 | Beach | H04N 17/002 |
| 11,032,520 | B2* | 6/2021 | Carey | G06F 21/55 |
| 11,082,665 | B2* | 8/2021 | Galvin | G08B 13/1968 |
| 11,218,670 | B2* | 1/2022 | Hodge | G06V 20/52 |
| 2002/0103856 | A1 | 8/2002 | Hewett et al. | |
| 2005/0097543 | A1* | 5/2005 | Hirayama | G06F 8/65 |
| | | | | 717/173 |
| 2006/0095566 | A1* | 5/2006 | Kanai | H04L 41/00 |
| | | | | 709/224 |
| 2006/0245731 | A1* | 11/2006 | Lai | H04N 7/181 |
| | | | | 348/E7.086 |
| 2008/0266407 | A1* | 10/2008 | Battles | G06F 9/451 |
| | | | | 348/E5.042 |
| 2009/0328023 | A1* | 12/2009 | Bestland | G06F 8/65 |
| | | | | 717/168 |
| 2010/0135643 | A1* | 6/2010 | Fleming | H04N 21/23424 |
| | | | | 386/224 |
| 2012/0063641 | A1 | 3/2012 | Venkatesh et al. | |
| 2012/0084562 | A1* | 4/2012 | Farina | G06F 21/575 |
| | | | | 713/168 |
| 2012/0179742 | A1* | 7/2012 | Acharya | H04N 21/23116 |
| | | | | 709/202 |
| 2014/0043491 | A1 | 2/2014 | Jiang et al. | |
| 2014/0095583 | A1* | 4/2014 | Houle | G06F 40/197 |
| | | | | 709/203 |
| 2015/0074658 | A1* | 3/2015 | Gourlay | G06F 8/65 |
| | | | | 717/172 |
| 2015/0098686 | A1* | 4/2015 | Obukhov | H04N 5/77 |
| | | | | 386/226 |
| 2015/0109128 | A1* | 4/2015 | Fadell | G08B 25/008 |
| | | | | 340/540 |
| 2015/0213323 | A1 | 7/2015 | Bala et al. | |
| 2016/0335414 | A1* | 11/2016 | Isaacs | G16H 40/40 |
| 2017/0046510 | A1* | 2/2017 | Chen | G06F 21/552 |
| 2017/0060383 | A1* | 3/2017 | Gomez | H04W 64/00 |
| 2019/0141605 | A1* | 5/2019 | Watson | H04W 12/08 |
| 2019/0182477 | A1* | 6/2019 | Shwartz | G06T 7/80 |
| 2019/0191123 | A1* | 6/2019 | Andersen | H04N 7/181 |
| 2019/0342356 | A1* | 11/2019 | Thomas | H04N 21/8458 |
| 2020/0193787 | A1* | 6/2020 | Jolivet | G08B 13/19682 |
| 2020/0288293 | A1* | 9/2020 | MacDonald | H04W 4/029 |
| 2020/0329120 | A1* | 10/2020 | Preveraud | H04L 12/2814 |
| 2021/0173727 | A1* | 6/2021 | Rusev | H04L 67/10 |

* cited by examiner

METHOD, SYSTEM AND COMPUTER PROGRAM PRODUCT FOR SERVING USER SETTINGS INTERFACE COMPONENTS

BACKGROUND

Open Network Video Interface Forum (ONVIF) is an organization that acts to facilitate the standardization of interfaces for effective interoperability of IP-based physical security products. In other words, ONVIF aims to standardize how IP products sold within the video surveillance industry communicate with each other. The open standard of ONVIF allows for interoperability of products from different manufacturers because they essentially speak the same language. As a result, the wide spread availability of ONVIF conformant products throughout the security industry has been a boon for reducing development efforts in relation to security systems that include devices sold by different manufacturers; however even when a security system is designed and built with such products, one limitation of ONVIF is that it does not target reducing development efforts as they relate to the management and maintenance of rules for capabilities of security-related devices such as video cameras, radar-based security devices, and other types of sensor devices.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method for serving software components that facilitate control and operation of a sensor device. The method includes retrieving, from at least one non-volatile storage, a model identifier for the sensor device and a firmware version installed at the sensor device. The method also includes processing a device configuration library to obtain executable codes for serving a plurality of pre-generated and device-specific user interface components. The method also includes carrying out a first selection of a reduced subset of compatible user interface components, from the plurality of user interface components, as a function of the model identifier and the firmware version. The method also includes generating a customized package containing the reduced subset of the compatible user interface components. The method also includes serving, via at least one communication network, the package for provisioning at the sensor device.

In accordance with another example embodiment, there is provided a security system within at least one communication network. The security system includes a sensor device having a model identifier and an installed firmware version stored in one or more of the sensor device and elsewhere within the at least one communication network. A server is in communication with the sensor device over the at least one communication network. The server is configured to retrieve the stored model identifier and the installed firmware version, and to process a device configuration library, stored within the at least one communication network, to obtain executable codes for serving a plurality of pre-generated and device-specific user interface components. The server is also configured to carry out a first selection of a reduced subset of compatible user interface components, from the plurality of user interface components, as a function of the model identifier and the firmware version. The server is also configured to generate a customized package containing the reduced subset of the compatible user interface components. The package is for provisioning at the sensor device.

Optionally, at least one example embodiment may include the provisioning of user documentation and/or technical support documentation in combination with other provisioning provided by one or more customized package that include the compatible user interface components.

Each of the above-mentioned embodiments will be discussed in more detail below, starting with example system and device architectures of the system in which the embodiments may be practiced, followed by an illustration of processing blocks for achieving an improved technical method, system and computer program product for serving user settings interface components.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
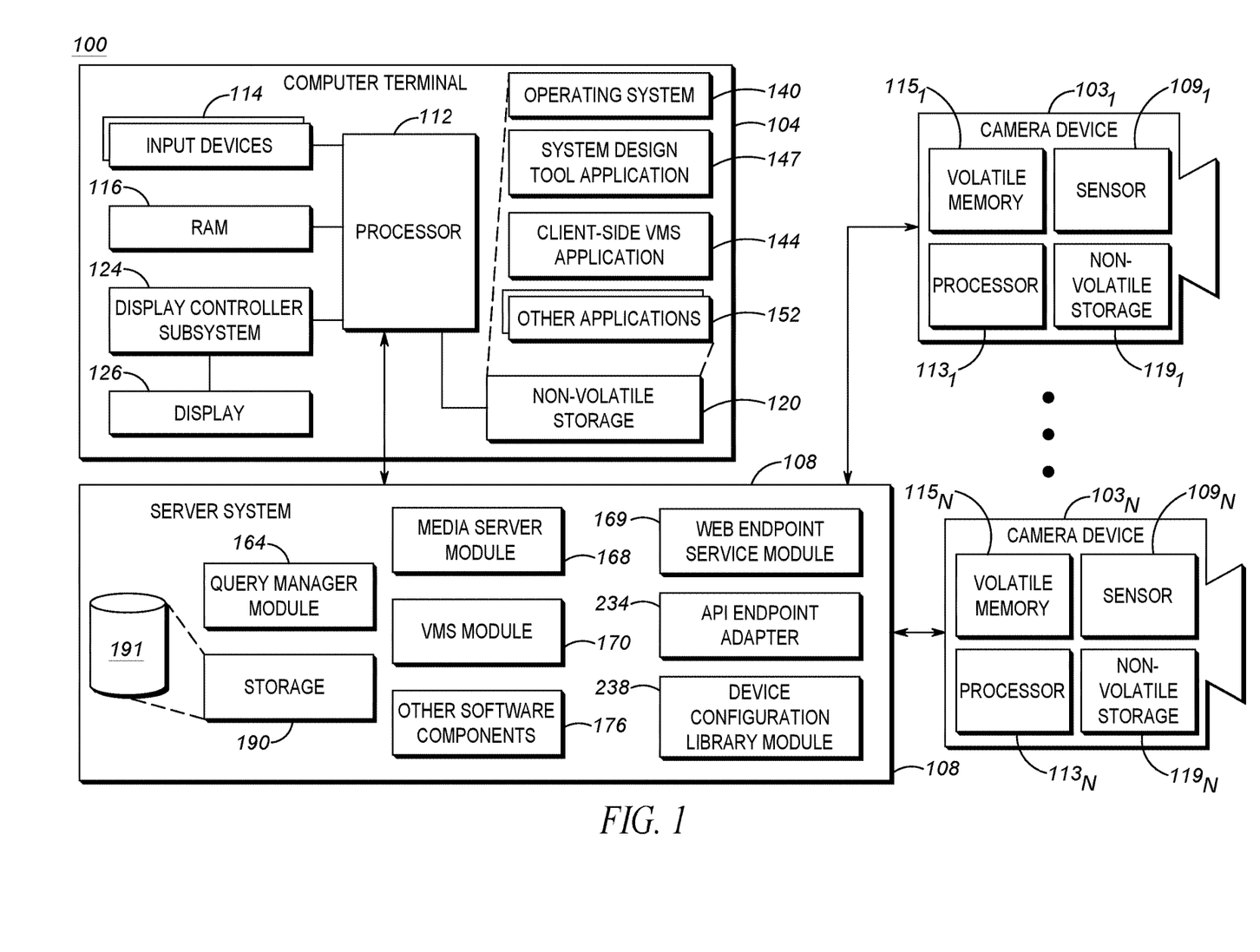
FIG. 1 is a block diagram of a security system in accordance with example embodiments.

Referring now to the drawings, and in particular FIG. 1, which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; an interactive two-way radio; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as, for example, a selected one or more of a keyboard, mouse, touch pad, roller ball and voice control module), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side Video Management System (VMS) application 144, system design tool application 147, and other applications 152, or parts thereof, may be temporarily loaded into a volatile store such as the RAM 116. The processor 112, in addition to its operating system functions, can enable execution of the various software applications on the computer terminal 104.

Regarding the system design tool application 147, this is a specialized application intended to provide computerized design, testing and/or simulation assistance in connection modeling a real-world security system.

Regarding the client-side VMS application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video data (and respective metadata) in support of, for example, client-side video review, video export, managing event detection, etc. In this regard, the query manager module is communicatively coupled to a storage (data store) 190. The storage 190 is described later herein in more detail.

Referring once again to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_n$ in the security system 100. The server system 108 also includes a web endpoint service module 169 (explained in more detail later herein), an API endpoint adapter 234 (explained in more detail later herein), a device configuration library module 238 (explained in more detail later herein), and a VMS module 170 supporting core server-side functionality relating to the VMS including for example, analytics rule management, appearance searching, etc.

The server system 108 also includes a number of other software components 176. These other software components will vary depending on the requirements of the server system 108 within the overall system. As just one example, the other software components 176 might include special test and debugging software, or software to facilitate version updating of modules within the server system 108. As another example of the other software components 176 may include an analytics engine component. The analytics engine component can, in some examples, be any suitable one of known commercially available software that carry out computer vision related functions (independent or complementary to any video analytics performed in the cameras) as understood by a person of skill in the art.

Regarding the data store 190, this comprises, for example, one or more databases 191 which facilitates the organized storing of recorded security video, non-video sensor data, etc. in accordance with example embodiments. The one or more databases 191 may also contain metadata related to, for example, the recorded security video that is storable within one or more data stores 190.

The illustrated security system 100 includes a plurality of camera devices $103_1$-$103_n$ (hereinafter interchangeably referred to as "cameras $103_1$-$103_n$" when referring to all of the illustrated cameras, or "camera 103" when referring to any individual one of the plurality) being operable to capture a plurality of images and produce image data representing the plurality of captured images. The camera 103 is an image capturing device and includes video security cameras. Furthermore, it will be understood that the security system 100 includes any suitable number of cameras (i.e. n is any suitable integer greater than one). It will be understood that (although not shown in FIG. 1) the security system 100 may include other types of sensor devices such as, for instance, radar-based security devices (for example, Avigilon Presence Detector™ manufactured by Avigilon Corporation), alarm panels that house sensor(s), etc.

Continuing on, the illustrated camera 103 includes an image sensor 109 for capturing a plurality of images. The camera 103 may be a digital video camera and the image sensor 109 may output captured light as a digital data. For example, the image sensor 109 may be a CMOS, NMOS, or CCD. In some example embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated as well.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may be a "multi-sensor" type of camera, such that the camera 103 includes pairs of two or more sensors that are operable to capture light in different and/or same frequency ranges.

It will also be understood that the camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a dedicated security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smart phone, video game console or controller.

The camera 103 includes one or more processors 113 and, coupled to the processors, one or more volatile memory devices 115 and one or more non-volatile storage devices 119. The camera 103 may also include various types of modules not explicitly shown in FIG. 1 such as, for example, a video analytics module that generates metadata outputted to the server system 108. Such metadata may include, for example, records which describe various detections of objects such as, for instance, pixel locations for the detected object in respect of a first record and a last record for the camera within which the respective metadata is being generated.

Regarding the non-volatile memory device 115, this can include a local memory (such as, for example, a random access memory and a cache memory) employed during execution of program instructions. Regarding the illustrated non-volatile storage device 119, in at least some examples this includes an at least one non-removable flash semiconductor memory chip storing firmware including operating system code for the camera 103. Other types of non-volatile storage that may be suitable for supporting the operation of the camera 103 include Read-Only Memory (ROM), Programmable Read-Only Memory (PROM), Erasable Programmable Read-Only Memory (EPROM), Electrically Erasable Programmable Read-Only Memory (EEPROM), magnetic storage, optical storage, magneto-optical storage, etc. Regarding the processor 113, this executes computer program instructions (such as, for example, an operating system and/or software programs), which can be stored in the memory and storage devices of the camera 103.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and/or the non-volatile storage 119 may be implemented within a SOC of the camera 103. Furthermore, when implemented in this way, a general purpose processor and one or more of a GPU or VPU, and a DSP may be implemented together within the SOC.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Figure 2:
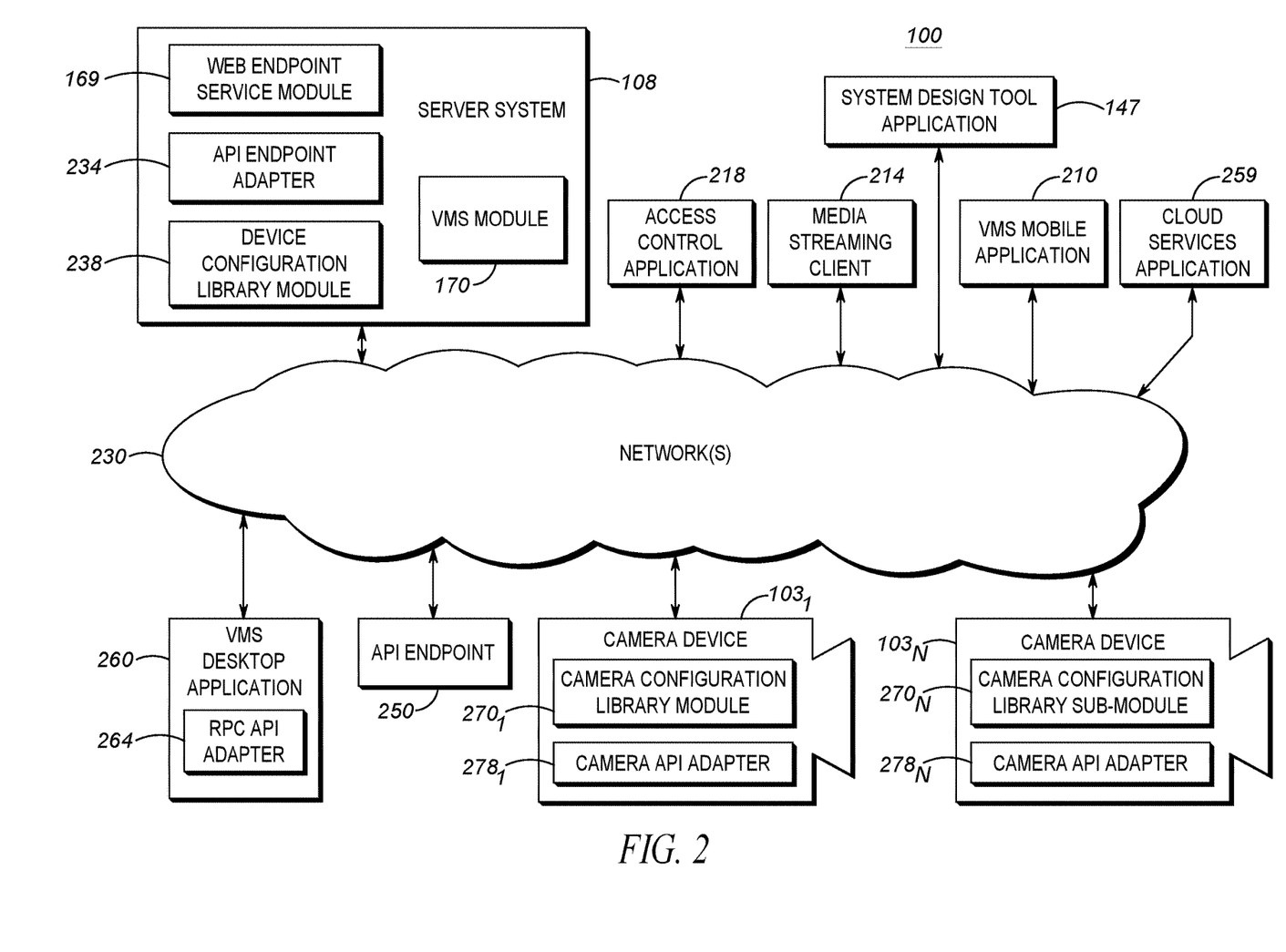
FIG. 2 is a block diagram showing additional details of the security system of FIG. 1.

Reference is now made to FIG. 2, which is a block diagram showing additional details of the security system 100. Shown within FIG. 2 are, among other things, a VMS mobile application 210, a media streaming client 214 and an access control application 218. Regarding the VMS mobile application 210, this will typically be an application downloaded and installed on a handheld device (typically battery powered) such as, for example, a tablet, a phablet, a smart phone or a personal digital assistant (PDA) and, in terms of functionality, the VMS mobile application 210 is similar in at least many respects to the client-side VMS application 144. Regarding the media streaming client 214, this is software for web-based video streaming (for example, video stored in the cloud). Regarding the access control application 218, this forms part of the other applications 152 (FIG. 1) and is an application for managing access control readers, controllers, etc. forming a part of some examples of the security system 100.

Still with reference to FIG. 2, each of the VMS mobile application 210, the media streaming client 214 and the access control application 218 can communicate with the server system 108 over one or more networks 230. Regarding the one or more networks 230, examples of suitable networks have already been herein described in connection with the detailed description of FIG. 1.

As mentioned previously, the server system 108 includes an Application Programming Interface (API) endpoint adapter 234. The API endpoint adapter 234 is configured to enable the web endpoint service module 169 to communicate with API endpoint 250 over the one or more networks 230. In particular, the illustrated API endpoint adapter 234 functions as a default transport adapter (thin layer that may be readily replaced) working cooperatively with the API endpoint 250, such that configuration data may be fetched and updated via the API endpoint 250.

Regarding the device configuration module 238, this is the internal local collection of user interface components for the web endpoint service module 169. For convenience of illustration, the device configuration module 238 is only shown within the server system 108; however one skilled in the art will appreciate that a similar module may be found elsewhere with the overall system including, for example, within the system design tool application 147, within cloud services application 259, etc.

For the illustrated server system 108, the web endpoint service module 169 has multiple methods of sourcing the components, and the web endpoint service module 169 can make decisions (for example, at runtime) about the most suitable component to use based on parameters including the hardware model and the firmware version. When a particular application requests for the web endpoint service module 169 to display a given user interface, the web endpoint service module 169 can then check: i) the device configuration library module 238; ii) whatever user interface component is available to be supplied at the connected sensor device; and iii) if a cloud repository exists, any user interface components stored there.

In at least some examples, the most suitable one of options i)-iii) is retrieved and employed. In such cases where a cloud connection and its repository are made available to the security system 100, small updates for versions of security software are conveniently facilitated by updating processes associated with option iii) mentioned above. Furthermore, option ii) supports alternative examples of the security system 100 where the system forms all or part of a so-called air-gapped network, because a sensor device to be added into the security system 100 can be shipped with a version of the appropriate configuration component which is "best available" on the date when the sensor device is manufactured. For at least some examples of where the sensor device is shipped with what is expected to be employed, it is also contemplated that a component version could be included in a suitable firmware update.

Also shown within FIG. 2 is a VMS desktop application 260. The VMS desktop application 260 is a client VMS application intended to be installed on more traditional/larger sized computing devices like a desktop or laptop computer. The VMS desktop application 260 includes an RPC API adapter 264 for communication with the VMS module 170 as an alternative to the previously described API endpoint adapter 234. In particular, the illustrated VMS desktop application 260 uses its own internal APIs which may include ONVIF™ support. Also, as previously mentioned, the VMS desktop application 260 may include a search session manager module which communicates with the query manager module 164 through the use of RPCs, and thus it is contemplated that the operation of the RPC API adapter 264 may impact that functionality as well.

Besides the RPC API adapter 264, other alternatives to the default API endpoint adapter 234 are also contemplated. For instance, taking as an example the system design tool application 147 (FIG. 1) such an application might provide a layer to allow the implementation of components to interact with its own internal simulation models.

Regarding the camera devices $103_1$-$103_n$, different details are illustrated in FIG. 2 than those shown in FIG. 1. Each of the camera devices $103_1$-$103_n$ includes a camera configuration library module 270 and a camera API adapter 278. Regarding the camera configuration library module 270, like the device configuration library module 238 this module stores a configuration library; however the configuration library is specific to the camera 103 and is within the camera 103 as contrasted to the device configuration library module 238 which forms part of the server system 108.

Regarding the camera API adapter 278, this provides an interface between the camera configuration library module 270 and other entities within the security system 100. In some example embodiments, the camera device 103 can push user settings interface components to any one or more of the server system 108, the VMS mobile application 210, the media streaming client 214, the access control application 218 and the VMS desktop application 260. In some example embodiments, user settings interface components can be pulled from the camera device 103 to any one or more of the server system 108, the VMS mobile application 210, the media streaming client 214, the access control application 218 and the VMS desktop application 260. In this "pull" scenario, it is also contemplated that the user settings interface components may be optionally stored at the receiving end in a local library/cache for future reuse. In all such above-described cases, it is contemplated that such communications of user settings interface components may be done in a manner that is seamless to and/or limits interactions and manual control efforts of user(s) of the security system 100. Also, the pushing and/or pulling of user settings interface components as herein described may facilitate de-centralizing (from the server system 108) of some command and control of the security system 100.

The illustrated security system 100 may include one or more of each of the following:
  Installed C application(s)
  Cloud hosted web interface(s)
  Local web interface(s)
  Mobile interface(s) which may be provide by, for example, an Internet connection
  Mobile (installed) application(s)
  Documentation tool(s)

Each of the above may retrieve (by way of, for example, a request) and process JavaScript™ interfaces (or other suitable interfaces) in order to use packaged user interface components as herein described.

Figure 3:
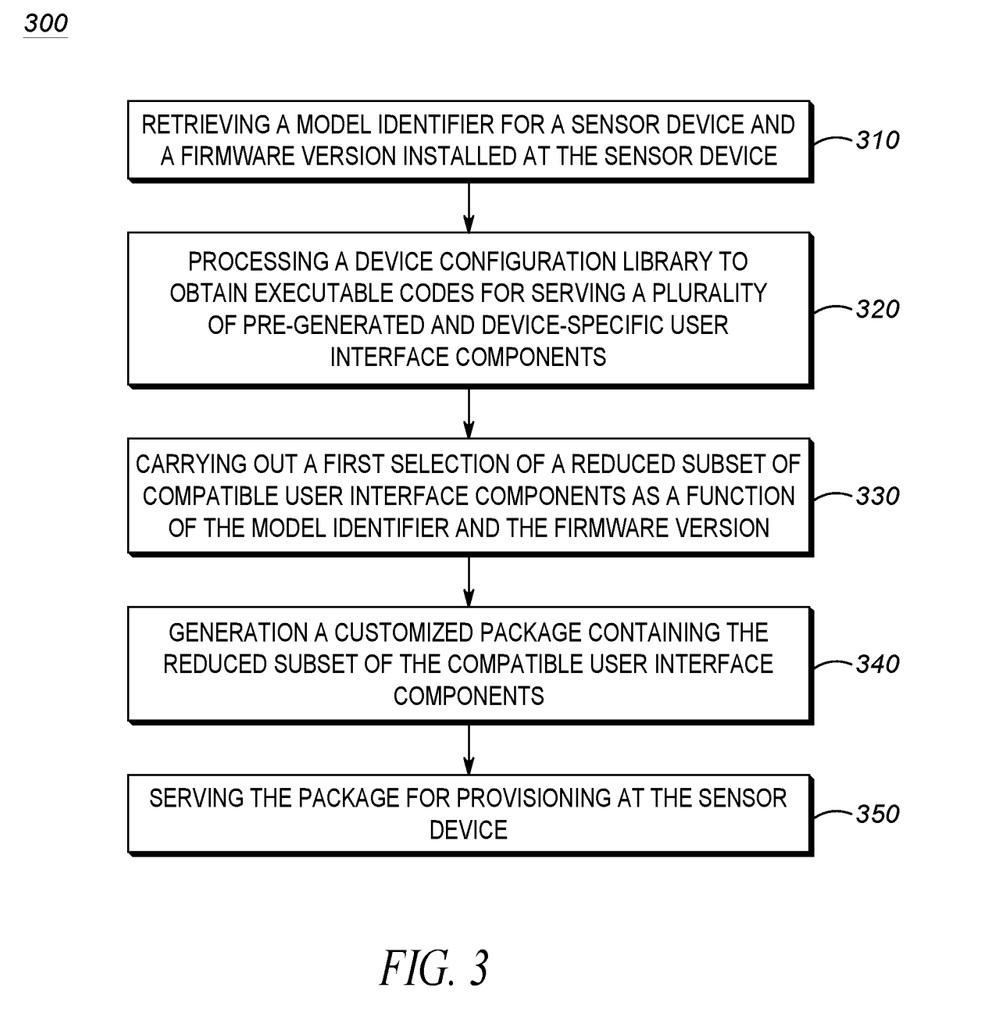
FIG. 3 is a flow chart illustrating a method for serving software components that facilitate control and operation of a sensor device in accordance with an example embodiment.

Reference is now made to FIG. 3. FIG. 3 is a flow chart illustrating a method 300 for serving software components that facilitate control and operation of a sensor device (for example, video camera, radar-based security device, etc.) in accordance with an example embodiment.

First, the following are retrieved (310): i) a model identifier for the sensor device; and ii) a firmware version installed at the sensor device.

Next, a device configuration library is processed (320) to obtain executable codes for serving a plurality of pre-generated and device-specific user interface components.

Next, the method 300 includes carrying out (330) a first selection of a reduced subset of compatible user interface components, from the plurality of user interface components, as a function of the model identifier and the firmware version.

Next, a customized package containing the reduced subset of the compatible user interface components is generated (340).

Finally, the method 300 includes serving (350), via at least one communication network, the package for provisioning at the sensor device.

Figure 4:
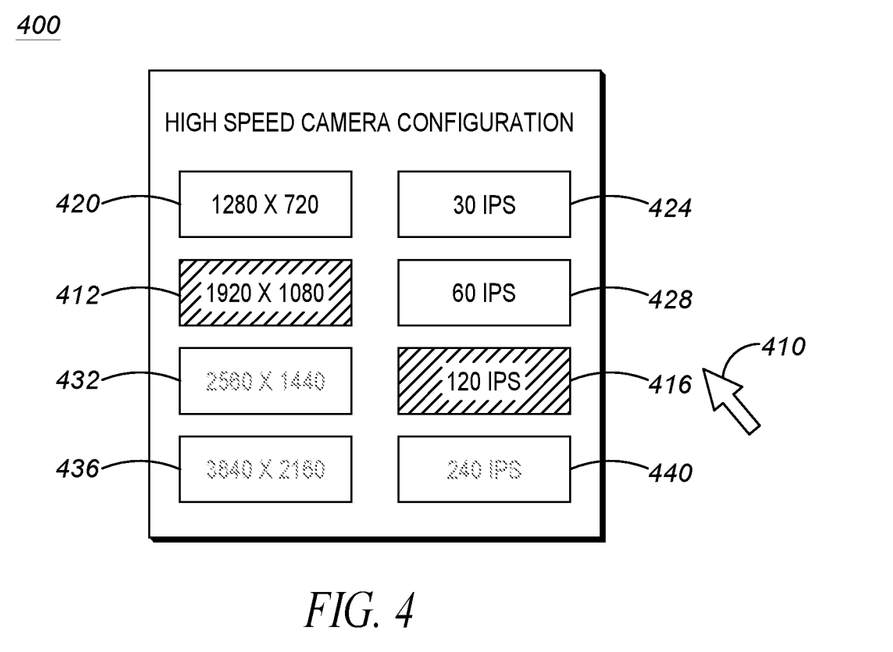
FIG. 4 is a diagram illustrating a user interface window, for user settings of a camera device, in accordance with an example embodiment.

Reference is now made to FIG. 4 which illustrates user interface window 400 within which settings of a camera device (for example, the camera device 103) may be modified. The user interface window 400 is generated on a display (for example, the display 126) and a user may interact therewith using cursor 410 of the user interface. Option 412 (resolution=1920×1080) and option 416 (frame rate=120 Images Per Second, i.e. having the respective acronym IPS shown in FIG. 4) have been chosen (i.e. the user clicked the cursor 410 on them). Options 420, 424 and 428 are unselected options. Options 432, 436 and 440 are unavailable options. Thus, FIG. 4 illustrates restricting a plurality of user interface selectable values of a particular performance setting of the camera device to a reduced subset in relation to a universe of selectable values of the particular performance setting (i.e. two of four selectable values for resolution, and three of four selectable values for IPS refresh rate). Disabling is also contemplated (i.e. zero/none of one or more values of a particular performance setting are made available to select).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot process a device configuration library to obtain executable code for serving a plurality of pre-generated and device-specific user interface components, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for serving software components that facilitate control and operation of a sensor device within a security system, the method comprising:
   retrieving, from at least one non-volatile storage, a model identifier for the sensor device and a firmware version installed at the sensor device;
   processing a device configuration library to obtain executable codes for serving a plurality of pre-generated and device-specific user interface components;
   carrying out, by a server of the security system, a first selection of a reduced subset of compatible user interface components, from the plurality of user interface components, as a function of the model identifier and the firmware version;
   generating a customized package containing the reduced subset of the compatible user interface components; and
   serving, via at least one communication network, the package for provisioning at the sensor device, and
   wherein at least one of the reduced subset of the compatible user interface components is, once deployed in operation, configured to restrict a plurality of user interface selectable values of a particular performance setting of the sensor device to a reduced subset of the selectable values of the particular performance setting.

2. The method of claim 1 further comprising:
   determining that the firmware version installed at the sensor device has been updated;
   carrying out a second selection of a plurality of updated compatible user interface components as a function of the model identifier and the updated firmware version;
   generating an updated package including the plurality of updated compatible user interface components; and
   serving, via the at least one communication network, the updated package for provisioning at the sensor device.

3. The method of claim 1 further comprising:
   providing a visual output, prior to the serving, identifying the reduced subset of the compatible user interface components to be served to the sensor device; and
   waiting until a user approval input in relation to the reduced subset of the compatible user interface components is received, such that the user approval input is a prerequisite to initiating the serving.

4. The method of claim 3 further comprising:
receiving a user rejection input in relation to a particular compatible user interface component of the user interface components; and
updating the package based on the user rejection input.

5. The method of claim 3 further comprising:
receiving a user alternate selection input in relation to selecting another compatible user interface component corresponding to the sensor device; and
updating the package based on the user alternate selection input.

6. The method of claim 1 wherein:
the at least one non-volatile storage includes a semiconductor memory located at the sensor device, that stores the device configuration library,
the sensor device is a camera device,
the package is transmitted from the camera device to another device,
the camera device and the another device form part of a video security system, and
the another device runs a Video Management Software (VMS) server and is coupled to the camera device over the at least one communication network.

7. The method of claim 6 wherein the another device is a Network Video Recorder (NVR) device.

8. The method of claim 7 further comprising:
determining that an alternate plurality of compatible user interface components are accessible to the NVR device; and
prompting for selection input from a user of the video security system as to whether the alternate plurality of compatible user interface components should be used instead of the package.

9. The method of claim 8 wherein the alternate plurality of compatible user interface components are stored in a cloud repository.

10. The method of claim 1 wherein another at least one of the reduced subset of the compatible user interface components is, once deployed in operation, configured to disable user interfacing ability for changing anything in relation to an entire option of the sensor device.

11. The method of claim 1 wherein:
the at least one non-volatile storage includes a semiconductor memory located at the sensor device that stores the device configuration library,
the package is transmitted from the sensor device to a computing device,
the sensor device and the computing device form part of a security system, and
the computing device is coupled to the sensor device over the at least one communication network, and stores user documentation that is provisioned by the package.

12. The method of claim 1 further comprising:
determining, prior to the serving, that a particular compatible user interface component of the user interface components to be served to the sensor device lacks a requisite security authentication; and
based on the determining, removing the particular compatible user interface from the package.

13. A security system within at least one communication network, the security system comprising:
a sensor device having a model identifier and an installed firmware version stored in one or more of the sensor device and elsewhere within the at least one communication network; and
a server in communication with the sensor device over the at least one communication network, the server configured to:
retrieve the stored model identifier and the installed firmware version;
process a device configuration library, stored within the at least one communication network, to obtain executable codes for serving a plurality of pre-generated and device-specific user interface components;
carry out a first selection of a reduced subset of compatible user interface components, from the plurality of user interface components, as a function of the model identifier and the firmware version; and
generate a customized package containing the reduced subset of the compatible user interface components, the package for provisioning at the sensor device, and
wherein at least one of the reduced subset of the compatible user interface components is, once deployed in operation, configured to restrict a plurality of user interface selectable values of a particular performance setting of the sensor device to a reduced subset of the selectable values of the particular performance setting.

14. The security system of claim 13 wherein the sensor device is a camera device.

15. The security system of claim 14 wherein the camera device includes a semiconductor memory that stores the device configuration library, and the camera device is configured to transmit the package from the camera device to the server.

16. The security system of claim 13 wherein another at least one of the reduced subset of the compatible user interface components is, once deployed in operation, configured to disable user interfacing ability for changing anything in relation to an entire option of the sensor device.

17. The security system of claim 13 further comprising a client device that includes a display, the display being configured to provide a visual output identifying the reduced subset of the compatible user interface components, and
wherein the visual output is provided prior to the reduced subset of the compatible user interface components being served to the sensor device.

* * * * *